Dec. 10, 1929.   M. COPE   1,739,387
KNOCKDOWN HOG HOUSE
Filed Dec. 1, 1926   2 Sheets-Sheet 1

INVENTOR.
Maurice Cope,
BY
Geo. F. Kimmel   ATTORNEY.

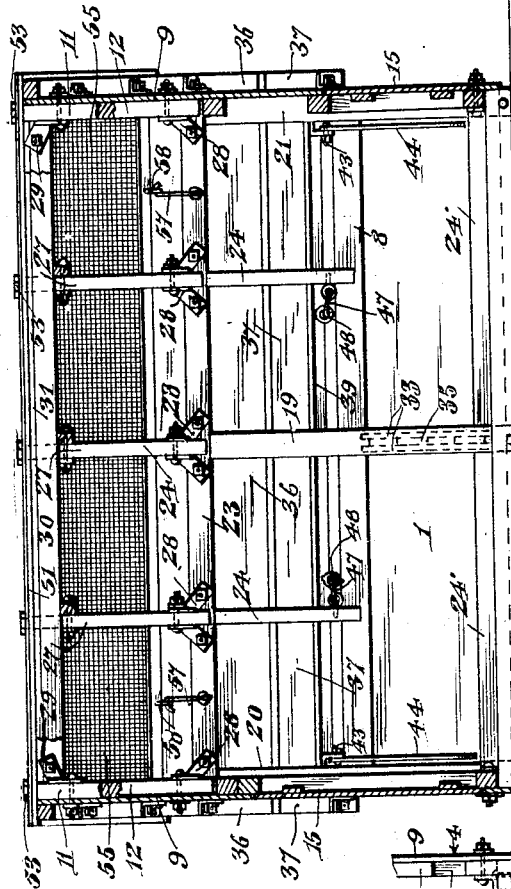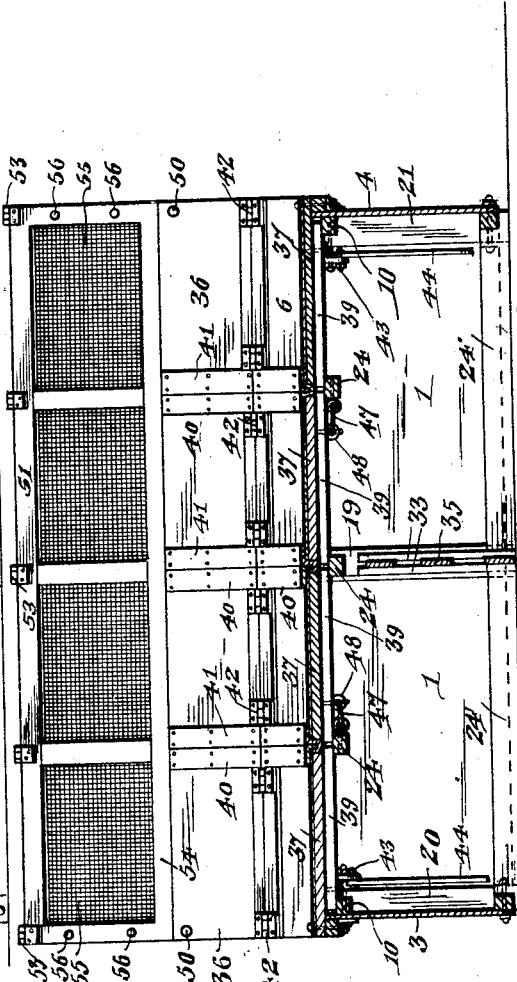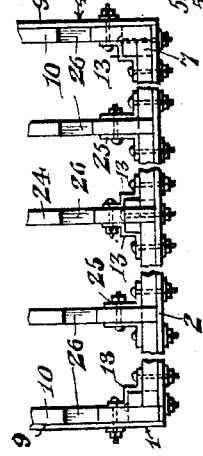

Patented Dec. 10, 1929

1,739,387

UNITED STATES PATENT OFFICE

MAURICE COPE, OF KINGSLEY, IOWA

KNOCKDOWN HOG HOUSE

Application filed December 1, 1926. Serial No. 152,007.

This invention relates to a knock down hog house and has for its object to provide, in a manner as hereinafter set forth, a structure of such class to enable farmers to raise hogs on new ground thereby eliminating barnyard diseases.

A further object of the invention is to provide, in a manner as hereinafter set forth a knock down hog house capable of being expeditiously assembled and disassembled when desired, and when disassembled and knocked down can be nested in a compact manner, stored in a small space or the sections thereof transported from one field to another with ease and rapidity.

Further objects of the invention are to provide, in a manner as hereinafter set forth, a knock down hog house, which is comparatively simple in its construction and arrangement, strong, durable, thoroughly efficient in its use, quickly assembled and disassembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 3 is a section on line 3—3 Figure 1.

Figure 4 is a section on line 4—4 Figure 2.

Figure 5 is a fragmentary view, in plan of one end of the house with the cover raised.

Figure 1:
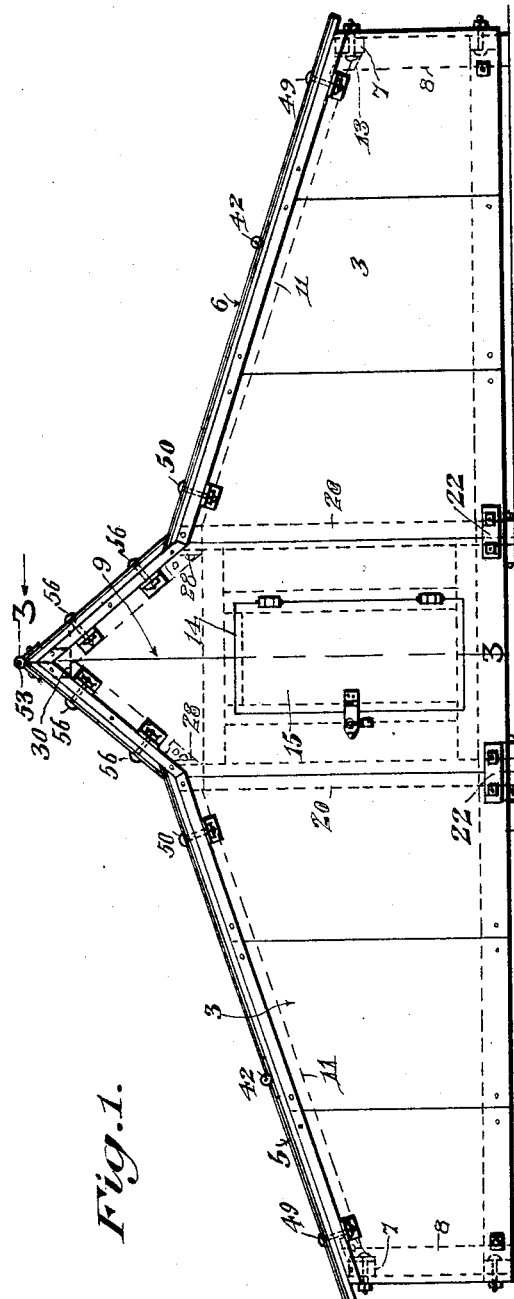
Figure 1 is a side elevation of a knock down hog house in accordance with this invention.

A hog house, in accordance with this invention, comprises a pair of closed detachable end walls indicated generally at 1, 2, a pair of detachable side walls indicated generally at 3, 4, a combined bracing and supporting structure indicated generally at 5, and a roof, indicated generally at 6. The combined bracing and supporting structure will be hereinafter termed a support and it is detachably connected to the side and end walls. The roof has a portion thereof detachably connected to the side walls and a portion thereof fixedly secured to the support.

Each end wall includes a pair of corner horizontal members 7 and a pair of corner posts 8 which are secured to the members 7 and extend below the lowermost thereof.

Each side wall includes, at the top thereof, a centrally disposed upstanding triangular shaped extension 9 having the lower end of substantial width. Each side wall gradually increases in height from each end thereof towards the lower end of said extension. The top edge of each side wall extends at an upward inclination from each end to the lower end of the extension. Each side wall is set up of a pair of outer portions and an intermediate portion, the intermediate portion being that part of the side wall formed with the extension 9. Each outer portion of a side wall has secured to its inner face, at the top thereof a supporting bar 10 mortised in its top edge. Each extension 9 has secured to its inner face, at the top thereof, a pair of oppositely disposed inclined supporting bars 11, 12 having the upper ends thereof spaced from each other. The side walls are detachably connected to the end walls by removable coupling devices 13. The intermediate portion of the side wall 3 is formed with a door opening 14, normally closed by a door 15, so that access can be had to the house or to provide for the entrance and exit of the hogs. The intermediate portion of the side wall 4 is provided with an opening 16, closed by a door 17, which is slidably connected, by means of a pair of strips 18, to the inner face of such intermediate portion. The opening 16 also provides for access to the house for any purpose desired.

The support includes two spaced, opposed sets of supporting standards. Each set consists of an inner standard 19 and a pair of outer standards 20, 21. The side walls are detachably connected to the outer standards of said sets, by removable coupling devices 22. Each set of standards are connected together at their tops by a transversely extending combined brace and supporting bar 23. Each set of standards is connected together at their lower ends by a transversely extending bar 24'. Each bar 23 has detachably connected therewith a set of spaced joists 24 which are mortised in their top edges. The joists 24 are detachably connected to the end walls at the tops of the latter, by removable coupling devices 25. The bars 10 of the side walls are mortised in their top edges in the same manner as the top edges of the joists 24 and the mortises are indicated at 26. The bars 10 of the side walls are detachably connected to the bars 23 in the same manner as the joists 24. The support further includes an inverted V-shaped frame 27 which is detachably connected to the bars 23 by the removable coupling devices 28, and said frame 27 is also detachably connected to the bars 11 and 12 by the removable coupling devices 29. The frame 27 includes a top bar 30 and the coupling devices 29 detachably connect said bar 30 to the bars 11 and 12. The bar 30 is formed with a tapered upper portion 31 to provide each side thereof with a bevel and said bevels extend in angular relation to each other. The inner or center standard of each set, which is indicated at 19, has secured therewith a pair of spaced retaining strips 33 which oppose a pair of spaced retaining strips 34 secured to a supporting post 8 of an end wall and the said opposed pairs of retaining strips provide means for maintaining a partition member 35 in a vertical position. The members 35 are provided to form the interior of the house with compartments or stalls. The strips 33 are of materially less height than the height of the standards 19.

Figure 2:
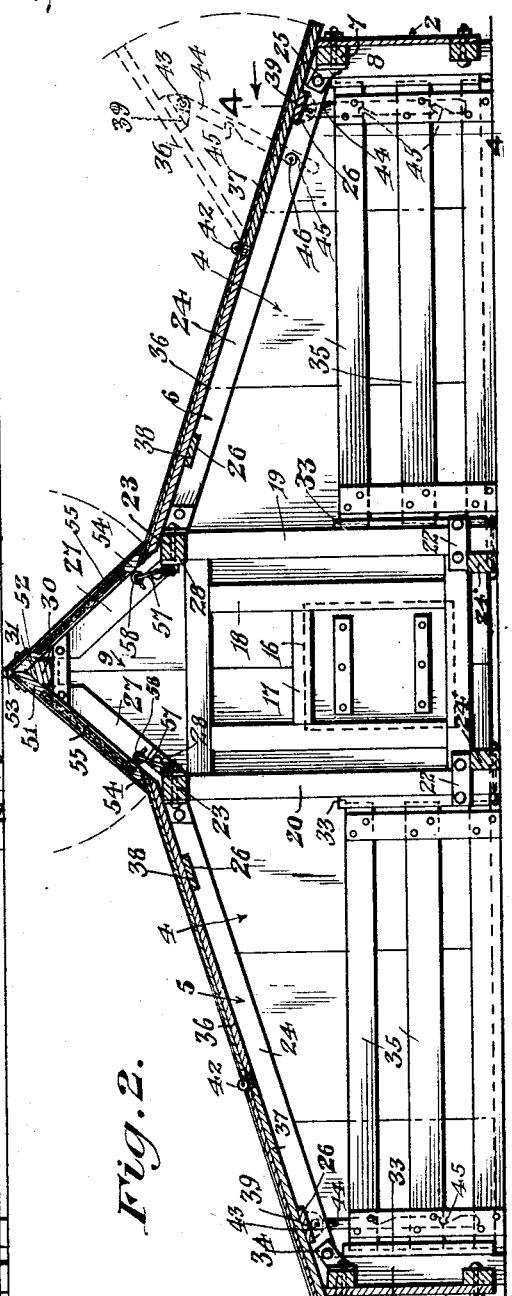
Figure 2 is a longitudinal sectional view thereof.

The roof 6 comprises a pair of outer sections and an intermediate section. As the outer sections are of the same construction, but one will be described, as the description of one will apply to the other. Each outer roof section consists of a plurality of stationary roofing members 36 arranged in parallelism and a series of hinged roofing members 37 positioned in parallelism when closed. The roofing members 36 are provided with cleats 38 which seat in the upper mortises 26 and the roofing members 37 are provided with cleats 39 which seat in the lower mortises 26. The opposed side edges of the roofing members 36, as well as the opposed side edges of the roofing members 37, are provided with interengaging reinforcing strips 40, 41, to prevent leakage between the joints. The roofing members 36 are secured to the joists 24. The roofing members 37 are hinged to the lower ends of the roofing members 36, as indicated at 42. The roofing members 37 project beyond the end walls 1, 2. Each of the outer roofing members 37, of each set, has hinged to the inner face thereof, as at 43, a retaining bar 44, which is provided with notches 45, coacting with studs 46, for the purpose of maintaining a roofing member 37 in an elevated position, as shown in dotted lines in Figure 2. The hinged roofing members 37 are provided to enable the cleaning of the house and to permit access to the house through the roof. The intermediate members of each set of roofing members 37 can be detachably secured in closed position, by any suitable means, and the means as shown consists of a hook 47, engaging with an eye 48 carried by the roofing member. The hook 47 is connected to a joist 24. The outer roofing members 37, of each set, are maintained in closed positions, by clamping devices, as indicated at 49. The outer roofing members 36 of the set of fixed roofing members are clamped to the side walls, by any suitable removable clamping devices, and which are indicated at 50.

The intermediate section of the roof is constructed to permit light and air to enter the interior of the house, and said intermediate section consists of a pair of oppositely extending frames 51, 52, hinged together at their upper edges, as indicated at 53. The frames 51 and 52 are mounted on the supporting frames 27 and their lower ends overlap the inner ends of the outer sections of the roof, as indicated at 54, Figure 2. The frames 51 and 52 are normally angularly disposed with respect to each other and to the outer sections of the roof and are outwardly and downwardly inclined from their upper ends to the outer sections of the roof. The frame 51, as well as the frame 52 is provided with a series of spaced reinforced translucent panels 55, preferably constructed of wire glass, although it is to be understood that the panels 55 can be constructed of any suitable material. The intermediate section of the roof, is detachably connected to the extensions 9 of the side walls of the house, by removable clamping devices 56 and the said frames 51, 52, of the intermediate section of the roof, are detachably connected to the bars 23, and for such purpose hooks 57, carried by the bars 23 detachably engage with eyes 58 carried by the frames 51, 52. The intermediate section of the roof is so set up that the frames 51 and 52 can be opened independently of the other or said intermediate section can be entirely removed when occasion requires.

A hog house, in accordance with this invention can be dismantled or knocked down or disassembled when occasion requires, arranged in a compact manner and readily transported to another part of the field and then expeditiously set up and further the roof is so constructed, as to provide for entrance of air and light to the interior of the hog house and furthermore so arranged that the intermediate portion of the roof can be entirely disconnected from the remaining elements of the structure and without disconnecting the outer sections of the roof. Therefore it is thought the many advantages of a hog house in accordance with this invention can be readily understood, and although the preferred embodiment of the invention is as illustrated and described, yet it is to be understood that changes in the details of construction can be had which will fall within the scope of the invention as claimed.

What I claim is:

1. In a hog house, a roof formed of a pair of outer portions and an intermediate portion, each of said outer portions consisting of an upper set of stationary parallel roofing members and a lower set of shiftable roofing members, the members of said lower set hinged at their upper ends to the lower ends of the members of the upper set and forming hinged closures to permit of access to the house through the roof thereof, and said intermediate portion being of inverted V-shape and formed of a pair of oppositely extending, independently shiftable frames hinged together at their upper ends and provided with translucent panels constituting means for the entrance of light and air to the interior of the house, said roofing members disposed lengthwise of said outer portions of the roof, and interengaging strips opposing the side edges of the roofing members of each set and further overlapping the members of each set, extending lengthwise thereof and providing closures between said members, the strips secured to the members of each of the upper sets being stationary and the strips secured to each of the members of the lower set bodily carried therewith when the lower members are shifted on their hinges.

2. In a hog house, side and front walls, a roof comprising a pair of outer portions and an inverted, upstanding intermediate portion independently removable and angularly disposed with respect to said outer portions, said intermediate portion projecting above the inner end of said outer portions and having its lower edge normally seating on the inner ends of the outer portions, said intermediate portion formed of a pair of hinged, oppositely inclined transparent elements constituting means for the entrance of light and air to the interior of the house, each of said side walls having its top edge conforming in contour to the shape of said roof, means for latching said intermediate portion to said side walls, each of said outer portions including sets of hinged members to permit of access to the house through the roof, and interengaging strips opposing the side edges of said hinged members and overlapping the latter to provide closures therebetween.

3. In a hog house, a roof comprising a pair of outer portions and an intermediate portion, each of said outer portions including sets of hinged members to permit access to the house through the roof, and interengaging strips opposing the side edges of said members and overlapping the latter to provide closures therebetween.

In testimony whereof, I affix my signature hereto.

MAURICE COPE.